United States Patent [19]

Stoneham

[11] Patent Number: 4,801,958
[45] Date of Patent: Jan. 31, 1989

[54] DUAL LENS CAMERA

[75] Inventor: Jeffrey R. Stoneham, Rochester, N.Y.

[73] Assignee: Eastman Kodak Company, Rochester, N.Y.

[21] Appl. No.: 145,332

[22] Filed: Jan. 19, 1988

[51] Int. Cl.$^4$ .............................................. G03B 3/00
[52] U.S. Cl. ................................................. 354/195.12
[58] Field of Search ........................ 354/195.12, 151

[56] References Cited

U.S. PATENT DOCUMENTS

| | | | |
|---|---|---|---|
| 2,148,011 | 2/1939 | Burke | 95/58 |
| 3,008,399 | 11/1961 | Bergerhoff | 95/53 |
| 3,044,375 | 7/1962 | Schaefer | 95/10 |
| 3,188,932 | 6/1965 | Geller et al. | 95/53 |
| 3,535,995 | 10/1970 | Ball | 95/58 |
| 4,204,758 | 5/1980 | Haynes | 354/152 |
| 4,249,814 | 2/1981 | Hull et al. | 354/154 |
| 4,527,874 | 7/1985 | Ohmura | 354/195.12 |
| 4,564,278 | 1/1986 | Ohmura | 354/195.12 |
| 4,589,748 | 5/1986 | Ohmura | 354/195.12 |

Primary Examiner—Michael L. Gellner
Attorney, Agent, or Firm—Roger A. Fields

[57] ABSTRACT

In a dual lens camera having a relatively longer focal length lens and a relatively shorter focal length lens selectively used for telephoto and wide angle photography, shutter and/or aperture plane defining means located behind each of the lenses is canted towards the exposure plane to provide additional interior space for the longer focal length lens. This arrangement allows for a decreased front to rear dimension of the camera.

5 Claims, 3 Drawing Sheets

DUAL LENS CAMERA

BACKGROUND OF THE INVENTION

1. Field of the Invention

The invention generally relates to the field of photography. More particularly, it relates to a dual lens camera of the type wherein a relatively longer focal length lens and a relatively shorter focal length lens are selectively used to expose film in the camera, for example to take a telephoto or a wide angle picture.

2. Description of the Prior Art

A dual lens camera typical of the prior art is partially illustrated in FIG. 1 of the accompanying drawings. The camera has a relatively longer focal length lens 1 and a relatively shorter focal length lens 3, either one of which is selectively used for telephoto and wide angle photography. A fixed mirror 5 is permanently located behind the longer focal length lens 1, and a movable mirror 7 is positionable behind the shorter focal length lens 3 in facing parallel relation to the fixed mirror. The movable mirror 7 in this position has a matte black coating 9 on its rear side which is disposed to block ambient light entering the shorter focal length lens 3 to prevent the light from reaching an exposure plane 11 (also referred to as a film plane) proximate a rear door 13 of the camera. In addition, the two mirrors 5 and 7 define a Z-shaped light-ray path (i.e., one that bends at angles of less than 90°) X, Y, Z from the longer focal length lens 1 to the exposure plane 11. Alternatively, the movable mirror 7 may be pivoted in a clockwise direction in FIG. 1 about a mounting pin 15, out of its blocking position behind the shorter focal length lens 3 to a non-blocking position depicted in broken line, to allow ambient light entering the shorter focal length lens to pass straight through to the exposure plane 11. In the non-blocking position, the movable mirror 7 deflects ambient light reflected by the fixed mirror 5 from the longer focal length lens 1 to prevent the light from reaching the exposure plane 11. Thus the alternate positions of the movable mirror 7 determine which one of the two lenses is used.

In the dual lens camera partially illustrated in FIG. 1, a shutter and/or aperture plane defining plate 17 is disposed with respective open portions 19 and 21 of the plate optically aligned with the longer and shorter focal length lens 1 and 3. The plate 17 is located between the two lenses 1 and 3 and the exposure plane 11, and it is supported parallel to the exposure plane and a front face 23 of the camera. Since the longer focal length lens 1 is greater lengthwise than the shorter focal length lens 3, the arrangement of the plate 17 parallel to the exposure plane 11 appears to necessitate a front to rear dimension D of the camera that prevents making the camera very compact in size.

SUMMARY OF THE INVENTION

The invention is believed to solve the above-described problem existing in known dual lens cameras by providing an improved dual lens camera of the type wherein (a) a relatively longer focal length lens and a relatively shorter focal length lens positioned proximate the front of said camera are selectively used to expose film at an exposure plane positioned proximate the rear of said camera, and (b) shutter and/or aperture plane defining means having respective portions optically aligned with said longer and shorter focal length lenses is positioned between said front of the camera and said exposure plane, and wherein the improvement comprises:

means supporting said shutter and/or aperture plane defining means inclined towards said exposure plane in a manner such that said portion of the shutter and/or aperture plane defining means aligned with said longer focal length lens is generally closer to said exposure plane than said portion of the shutter and/or aperture plane defining means aligned with said shorter focal length lens, whereby a front to rear dimension of said camera will be reduced.

More particularly, the longer focal length lens is positioned according to the invention to occupy the space that would otherwise have been occupied by the portion of the shutter and/or aperture plane defining means aligned with that lens had the shutter and/or aperture defining means been supported parallel to the exposure plane (as in prior art devices) rather than inclined towards the exposure plane.

DESCRIPTION OF THE PREFERRED EMBODIMENT

Figure 1:
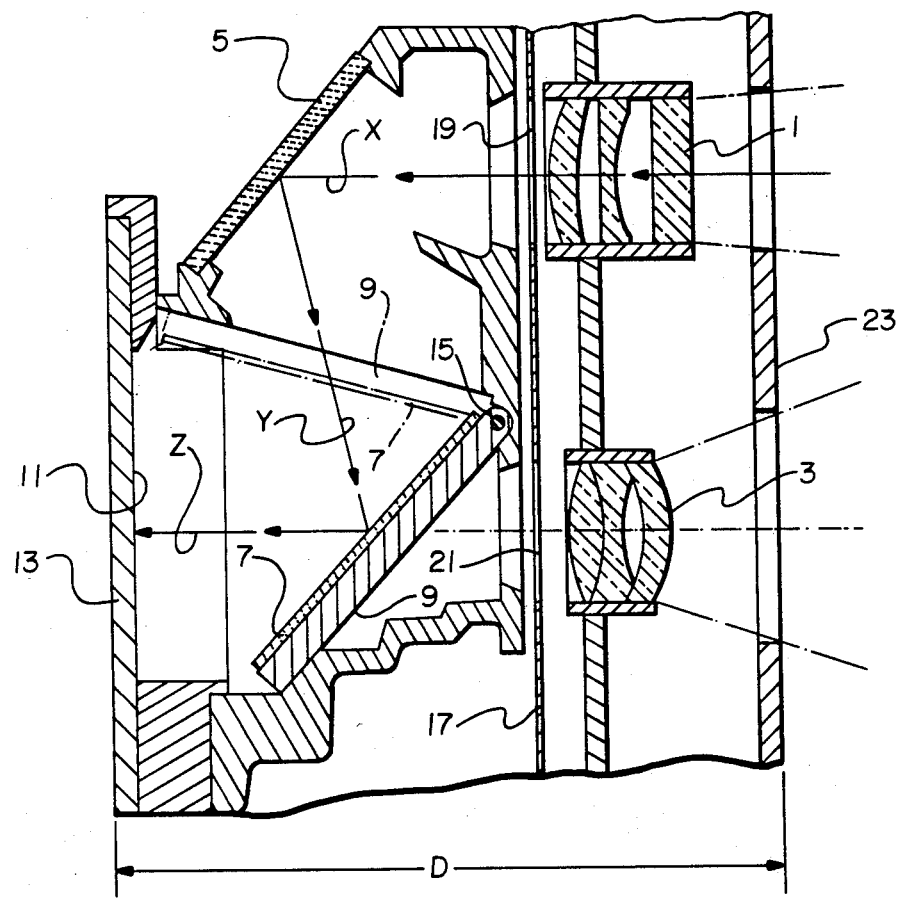
FIG. 1 is an elevation view in cross-section of a prior art dual lens camera.
Figure 2:
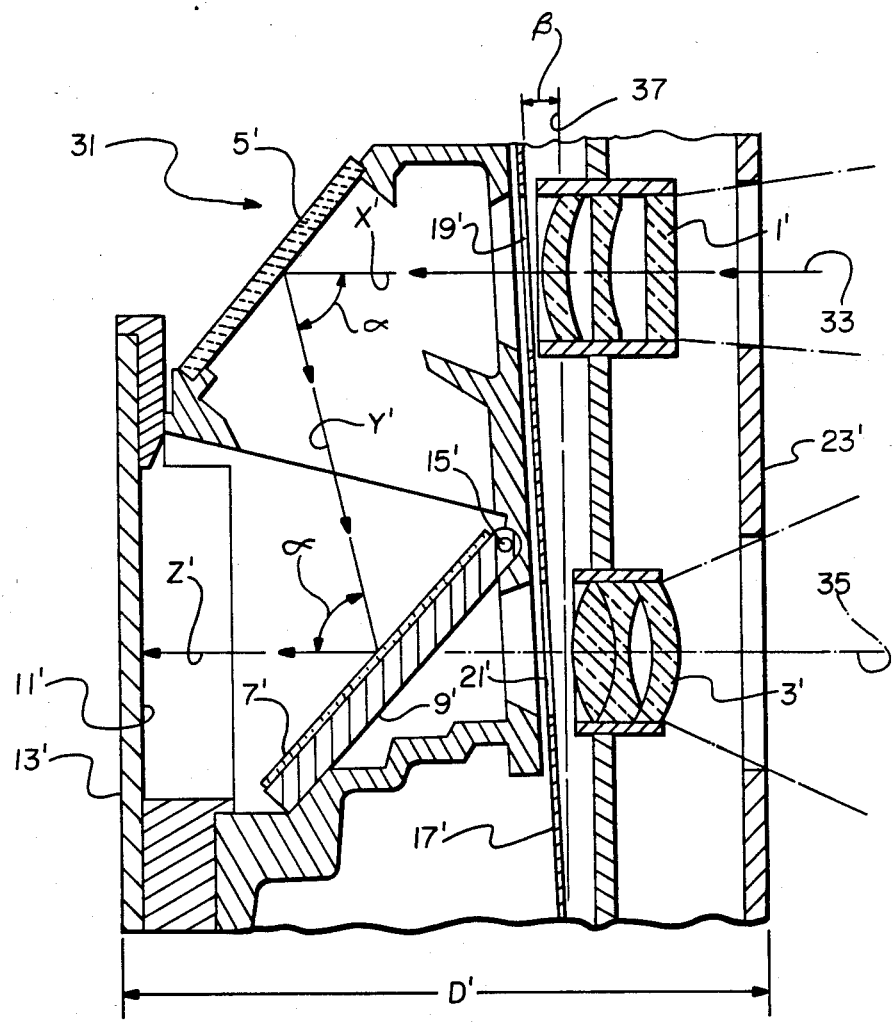
FIG. 2 is an elevation view in cross-section of an improved dual lens camera according to a preferred embodiment of the invention, showing the camera in a telephoto mode.

An improved dual lens camera according to a preferred embodiment of the invention is partially illustrated in FIG. 2 of the drawings. The improved camera is generally indicated by the reference number 31, and to the extent it includes certain elements similar to those included in the prior art camera of FIG. 1 the elements are indicated by the same reference numbers as in FIG. 1 but followed by a prime (') designation.

Figure 3:
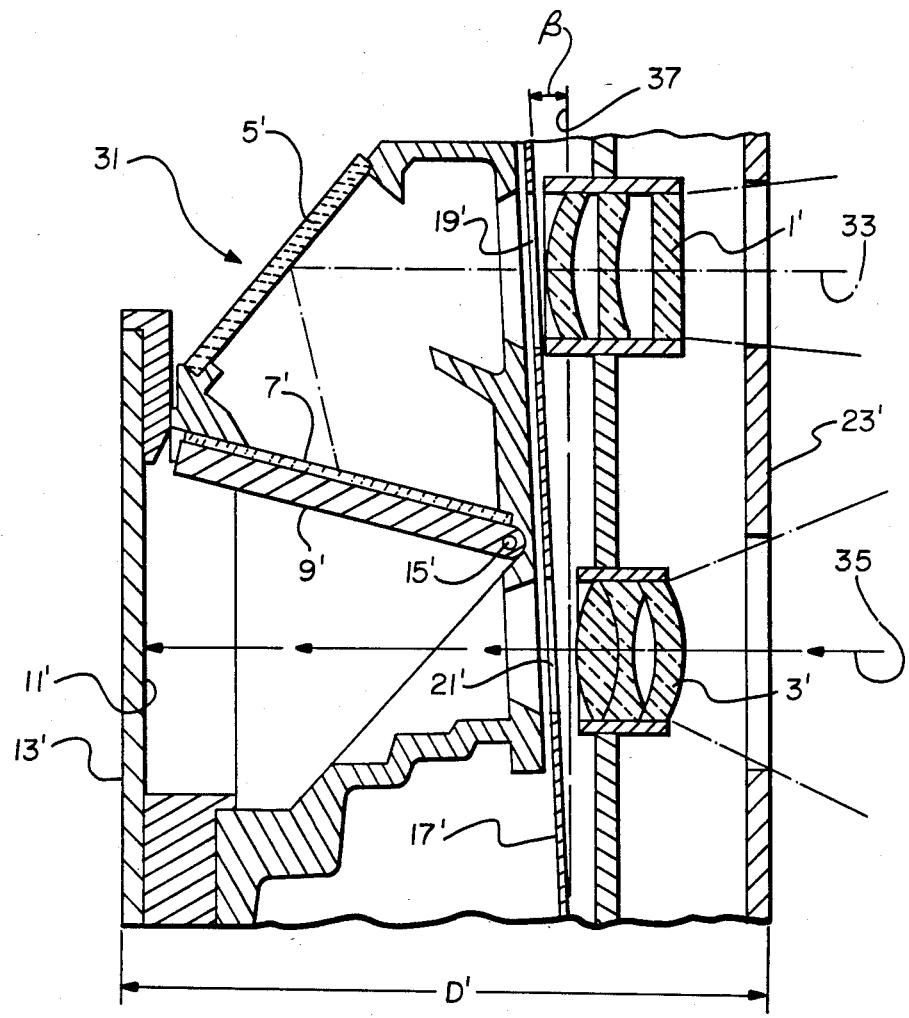
FIG. 3 is an elevation view in cross-section of the improved dual lens camera, showing the camera in a wide angle mode.

As shown in FIG. 2, the improved camera 31 has a relatively longer focal length lens 1' and a relatively shorter focal length lens 3', either one of which is selectively used for telephoto and wide angle photography. A fixed mirror 5' is permanently located behind the longer focal length lens 1', and a movable mirror 7' is positionable behind the shorter focal length lens 3' in facing parallel relation to the fixed mirror. The movable mirror 7' in this position has a matte black coating 9' on its rear side which is disposed to block ambient light entering the shorter focal length lens 3' to prevent the light from reaching an exposure plane 11' (also referred to as a film plane) proximate a rear door 13' of the camera 31. In addition, the two mirrors 5' and 7' define a Z-shaped light-ray path (i.e., one that bends at angles of less than 90 degrees) X', Y', Z' from the longer focal length lens 1' to the exposure plane 11'. Alternatively, as shown in FIG. 3, the movable mirror 7' may be pivoted in a clockwise direction about a mounting pin 15', out of its blocking position behind the shorter focal length lens 3' to a non-blocking position, to allow ambient light entering the shorter focal length lens to pass straight through to the exposure plane 11'. In the non-blocking position, the movable mirror 7' deflects ambient light reflected by the fixed mirror 5' from the longer focal length lens 1' to prevent the light from reaching the exposure plane 11'. Thus the alternate positions of the movable mirror 7' shown in FIGS. 2 and 3 determine which one of the two lenses 1' and 3' is used.

In FIG. 2, the Z-shaped light-ray path X', Y', Z' from the longer focal length lens 1' to the exposure plane 11' has its first component X' aligned with the optical axis 33 of the longer focal length lens, its third component Z' aligned with the optical axis 35 of the shorter focal length lens 3', and its second component Y' forming the same acute angle α with the first and third components. The first component X' is measured from the longer focal length lens 1' to the fixed mirror 5'. The second component Y' is measured from the fixed mirror 5' to the movable mirror 7' (in its blocking position). The third component Z' is measured from the movable mirror 7' to the exposure plane 11'. These measurements and orientations of the components X', Y' and Z' of the Z-shaped light-ray path X', Y', Z' in FIG. 2 correspond to similarly taken measurements and orientations of the components X, Y and Z of the Z-shaped light-ray path X, Y, Z in FIG. 1.

In the improved camera 31, a shutter and/or aperture plane defining plate 17' is arranged with respective open substantially co-planar portions 19' and 21' of the plate concentrically disposed about the optical axes 33 and 35 of the longer and shorter focal length lenses 1' and 3'. The plate 17' is located between the two lenses 1' and 3' and the exposure plane 11', and it is supported slightly inclined inwardly towards the exposure plane 11'. Specifically, the plate 17' is canted by an angle β, preferably about 2°, measured from the vertical broken line 37 in FIG. 1. The broken line 37 indicates the position the plate 17' would have occupied had the plate been supported parallel to the exposure plane 11' and a front face 23' of the improved camera 31 as in the example of the plate 17 in the prior art camera of FIG. 1.

Since the longer focal length lens 1' is greater lengthwise than the shorter focal length lens 3', the arrangement of the shutter and/or aperture plane defining plate 17' inclined inwardly towards the exposure plane 11' provides additional interior space for the longer focal length lens. This space allows the longer focal length lens 1' to be positioned further inwardly as compared to the longer focal length lens 1 to FIG. 1. Thus the front to rear dimension D' of the improved camera 31 of FIG. 2 can be made less than the corresponding dimension D of the prior art camera of FIG. 1.

A brief comparison of the Z-shaped light-ray path X', Y', Z' in FIG. 2 with the Z-shaped light-ray path X, Y, Z in FIG. 1 is noteworthy. The sum of the components X' and Y' and Z' is equal to the sum of the components X and Y and Z. The component X' is less than the component X. The component Y' is greater than the component Y. The component Z' is equal to the component Z. Consequently, the front to rear dimension D' in FIG. 2 can be made less than the corresponding dimension D in FIG. 1 by the difference X−X' or ΔX.

The invention has been described with reference to a preferred embodiment. However, it will be appreciated that variations and modifications can be effected with the ordinary skill in the art without departing from the scope of the invention. For example, in FIG. 2, the shutter and/or aperture plane defining plate 17' can be located between the two lenses 1' and 3' and the front face 23' of the improved camera 31. However, in this case, the front face 23' would be disposed parallel to the plate 17', and therefore it would be inclined towards the exposure plane 11'.

In addition, the open portions 19' and 21' of the shutter and/or aperture defining plate 17' need not be coplanar. All that is required is that the open portion 19' be located closer to the exposure plane 11' than is the open portion 21'.

I claim:

1. An improved dual lens camera of the type wherein (a) a relatively longer focal length lens and a relatively shorter focal length lens positioned proximate the front of said camera are selectively used to expose film at an exposure plane positioned proximate the rear of said camera, and (b) shutter and/or aperture plane defining means having respective portions optically aligned with said longer and shorter focal length lenses is positioned between said front of the camera and said exposure plane, and wherein the improvement comprises:

means supporting said shutter and/or aperture plane defining means inclined towards said exposure plane in a manner such that said portion of the shutter and/or aperture plane defining means aligned with said longer focal length lens is generally closer to said exposure plane than said portion of the shutter and/or aperture plane defining means aligned with said shorter focal length lens, whereby a front to rear dimension of said camera will be reduced.

2. The improvement as recited in claim 1, wherein said longer focal length lens is positioned to occupy a space that would otherwise have been occupied by said portion of the shutter and/or aperture plane defining means aligned with that lens had said shutter and/or aperture plane defining means been supported parallel to said exposure plane rather than inclined towards said exposure plane.

3. The improvement as recited in claim 2, wherein said shutter and/or aperture plane defining means is positioned between said longer and shorter focal length lenses and said exposure plane.

4. An improved dual lens camera of the type wherein (a) a relatively longer focal length lens and a relatively shorter focal length lens positioned proximate the front of said camera are selectively used to expose film at an exposure plane positioned proximate the rear of said camera, and (b) shutter and/or aperture plane defining means common to said longer and shorter focal length lenses is positioned between the lenses and said exposure plane, and wherein the improvement comprises:

means supporting said shutter and/or aperture plane defining means inclined towards said exposure plane to provide additional interior space for said longer focal length lens, whereby a front to rear dimension of said camera will be reduced.

5. The improvement as recited in claim 4, wherein said supporting means supports said shutter and/or aperture plane defining means at a relatively slight angle with respect to the position the shutter and/or aperture plane defining means would have occupied had said shutter and/or aperture plane defining means been supported parallel to said exposure plane rather than inclined towards said exposure plane.

* * * * *